United States Patent [19]

McCarthy

[11] Patent Number: 4,644,467
[45] Date of Patent: Feb. 17, 1987

[54] MULTI-LEVEL DYNAMIC PRIORITY SELECTOR GROUPS OF DATA ELEMENTS

[76] Inventor: John M. McCarthy, 405 W. Apple Tree Rd., Glendale, Wis. 53217

[21] Appl. No.: 454,456

[22] Filed: Dec. 29, 1982

[51] Int. Cl.$^4$ ............................................ G06F 13/18
[52] U.S. Cl. ..................................................... 364/200
[58] Field of Search ................................. 364/200, 900

[56] References Cited

U.S. PATENT DOCUMENTS

| | | | |
|---|---|---|---|
| 4,224,613 | 9/1980 | Kaiser et al. | 340/679 |
| 4,322,813 | 3/1982 | Howard et al. | 364/900 |
| 4,373,183 | 2/1983 | Means et al. | 364/200 |
| 4,392,201 | 7/1983 | Brown | 364/200 |
| 4,402,040 | 8/1983 | Evett | 364/200 |
| 4,414,669 | 11/1983 | Heckelman et al. | 371/49 |
| 4,458,314 | 7/1984 | Grimes | 364/200 |
| 4,511,959 | 4/1985 | Nicolas et al. | 364/200 |
| 4,536,839 | 8/1985 | Shah et al. | 364/200 |
| 4,590,555 | 5/1986 | Bourrez | 364/200 |
| 4,590,586 | 5/1986 | Zenk et al. | 364/900 |
| 4,600,992 | 7/1986 | Boudreau | 364/200 |

Primary Examiner—Archie E. Williams, Jr.
Attorney, Agent, or Firm—Andrus, Sceales, Starke & Sawall

[57] ABSTRACT

A priority selector includes a plurality of interface circuits (16) each connected to a corresponding data element (13) and operatively connected in common with a priority identification signal generator (15) to selectively interface the data elements (13) with a common control, i.e. computer (12). The priority selector generates a dynamic code to select a data element (13) in response to the priority significance of its assigned code being at least as great as the priority significance of the assigned codes associated with other data elements (13) seeking priority recognition. Each interface circuit (16) includes a series of encodeable levels each featuring a codeable pair of individual select lines (23) including a high priority individual select line (26) and a low priority individual select line (27) both connected in common with corresponding codeable pairs of individual select lines from corresponding levels of the same priority importance associated with other interface circuits (16) to form a series of common circuits to generate the dynamic code. The priority selector also functions in conjunction with the common control (12) to select any one or group of data elements (13). The priority selector also functions with the common control (12) to detect and locate malfunctions and, in certain circumstances, to remove a data element (13) from system operation due to a sensed malfunction. The priority selector provides numerous circuits and multiple functions and operations.

14 Claims, 6 Drawing Figures

MULTI-LEVEL DYNAMIC PRIORITY SELECTOR GROUPS OF DATA ELEMENTS

BACKGROUND OF THE INVENTION

This invention relates to a priority selector for a plurality of data elements selectively seeking priority recognition.

Data communications may take many forms such as between a central processing unit (i.e. computer) and numerous input/output (I/O) devices or between a centralized telephone office and a series of telephone lines, for example.

Some prior computer systems do not provide any interrupt capability but rather continually address each device or element to determine whether it is ready to receive or transmit data.

More recent equipment permits a central processing unit to compute until notified that a device or element is ready to transmit or receive data. Some systems, however, require the computer to poll each device or element to determine which device or element is seeking the interrupt.

Other systems employ a daisy chain configuration wherein interface circuits for each device are interconnected in serial configuration so that the device connected nearest the computer would, by circuit definition, have the highest assigned priority while each subsequently connected interface circuit would have a sequentially lower priority. In such daisy chain construction, an interrupt being detected in the middle of the daisy chain would prevent recognition of a higher priority interrupt until the computer completes servicing of a previously recognized interrupt. Frequently, such systems "freeze" the operation to prevent interference from subsequently entered higher priority interrupts when the system is servicing a recognized interrupt.

Multiple daisy chains have also been utilized for priority recognition purposes. Such systems are very complex and require numerous program instructions to save, store and freeze the various interrupts as they occur which wastes computing time and computing flexibility.

SUMMARY OF THE INVENTION

This invention relates to a priority selector for a plurality of data elements selectively seeking priority recognition.

The priority selector features a dynamic code generating system which is far superior to conventional daisy chain serial configurations and other systems.

An encoder operates to provide a series of assigned codes each having an assigned priority significance associated with one of the data elements. A dynamic code is generated which represents the data element with the highest priority significance in response to the assigned codes for the data elements seeking priority recognition.

The assigned codes for the data elements seeking priority recognition are monitored to select a data element in response to the priority significance of its assigned code being at least as great as a priority significance of the assigned codes associated with the other data elements.

A control is connected to the code monitor to read the assigned code having the highest priority significance associated with a data element issuing the priority request. Such control includes a code detector operable to provide a unique code signal in response to the assigned code of such data element issuing the priority request having the highest priority significance.

The priority selector is very versatile. For example, the control connected to the monitor may function to select a predetermined data element by issuing a predetermined address code. In another sequence, the control is operable to select any one of a number of groups of data elements by issuing a predetermined address code.

The priority selector also uniquely functions to locate and isolate malfunctions occurring therein. For example, the control is connected to the code monitor to detect which data element is associated with a malfunction therein. The control is also capable of functioning with the code monitor to remove one of the data elements from a priority selection sequence in response to a sensed malfunction.

The priority selector is particularly desirable for use with a plurality of data elements which are selectively vying for priority selection. A series of encodeable levels are each operatively connected in common with the data elements. An encoder provides a series of assigned codes to encode such encodeable levels with each code having an assigned priority significance associated with one of the data elements. A monitor responds to the encodeable levels and the assigned codes to select a data element in response to the priority significance of its assigned code being at least as great as the priority significance of the assigned codes associated with other data elements.

The monitor may include a sensor which compares the code sensed at each encodeable level with the assigned code for such level to provide a level qualified signal in response to the priority significance of such assigned code being at least as great as a priority significance of the assigned codes for the corresponding levels associated with other data elements.

The various levels are arranged in descending order of priority importance [i.e. in accordance with its binary significance for example]. The monitor includes an interlock which selectively enables succeeding levels of lower priority importance in response to a level qualified signal from a level of higher priority importance. The monitor selects a data element in response to sensed qualified signals from each level sensor.

Each level includes an identification circuit which is connected in common circuit with corresponding identification circuits associated with other data elements.

Such common circuit may include a codeable pair of individual select lines including a high priority individual select line and a low priority individual select line, with each codeable pair of individual select lines being connected in common with corresponding codeable pairs of individual select lines from corresponding identification levels of the same priority importance associated with other data elements.

The encoder operates to assign a unique code to each codeable pair of individual select lines for each identification circuit associated with the data element issuing a priority request and having the highest assigned priority significance.

The control responds to a unique code at each level to provide a unique code signal indicating that priority selection is complete. Further, the control monitors all pairs of individual select lines and selectively reads the assigned code associated with the highest priority data element issuing a priority request.

Further, the control is operatively connected to all pairs of individual select lines and may function to select a predetermined data element by issuing a predetermined address code or may select any one of a number of groups of data elements by issuing another predetermined address code. Also, the control is operatively connected to all pairs of individual select lines to detect malfunctions and identify which data element is associated with the malfunctioning circuit. The control can also function through the pairs of individual select lines to remove one of the data elements from a priority selection sequence in response to a malfunction within the monitor.

The series of identification circuits associated with the series of levels are sequentially arranged in descending order of priority importance from a first identification circuit of highest priority to a last identification circuit of lowest priority. A qualifying circuit within each identification circuit is operatively connected to the individual select circuits and to the encoder to operate between a first condition to provide a qualified signal in response to the assigned code having a priority significance at least as great as a priority significance of corresponding identification circuits associated with other data elements and a second condition to provide a non-qualified signal in response to the assigned code having a priority significance less than the priority significance of at least one other identification circuit associated with another data element. A circuit monitors all qualifying circuits for all levels associated with a particular data element and provides a data element qualified signal in response to qualified signals from all of the identification circuits to designate such associated data element as having the highest assigned priority relative to all other data elements issuing priority requests.

The priority selector thus advantageously provides a plurality of interface circuits each connected to a corresponding data element and also connected in common with a priority identification signal generator.

Each interface circuit provides a priority request circuit operatively connected to a corresponding data element and to a common control to provide a priority initiation signal in response to a priority request signal from the data element and an enable signal from the common control.

Each interface circuit includes a series of level select identification elements which are sequentially arranged in descending order of priority importance from a first identification element of highest priority importance to a last identification element of lowest priority importance. Each identification element provides a codeable input selectively operable to provide a first coded signal corresponding to a high priority designation and a second coded signal corresponding to a low priority designation. Each identification element further includes an encoding circuit which is operatively connected to the codeable input and to the priority request circuit. Such encoding circuit operates and responds to the priority initiation signal and operates between a first condition to provide a high priority code on the high priority individual select line and a low priority code on the low priority individual select line in response to the first coded signal from the codeable input and a second condition to provide a low priority code on the high priority individual select line and a high priority code on the low priority individual select line in response to the second coded signal from the codeable input.

The qualifying circuit for each identification element is operatively connected to the codeable input and to the high and low priority individual select lines and operates between a first condition to provide a level qualified signal in response to a high priority code on the high priority individual select line and the first coded signal from the codeable input. The qualifying circuit also operates to the first condition in response to a low priority code on the high priority individual select line and the second coded signal from the codeable input. The qualifying circuit operates to a second condition to provide a level disqualified signal in response to a high priority code on the high priority individual select line and the second coded signal from the codeable input.

The interlock circuit interconnects adjacent identification element to operatively enable or disabled descending identification elements of lower priority importance in response to a level qualified or disqualified output signal from a higher priority level select identification element.

A priority responsive circuit is operatively connected to each of the identification elements and to the data element and to the common control and is operable between a first condition to provide a data element qualified signal indicating that the corresponding data elements possesses the highest assigned priority with respect to all data elements that have issued a priority request in response to level qualified signals from each identification element and a second condition to provide a data element non-qualified signal in response to a level disqualified signal from one or more of the identification elements.

The priority identification signal generator includes a series of codeable inputs connected to the common control to send and receive coded signals corresponding to one or more of the data elements. A series of latches are operatively connected to the codeable inputs to selectively store the coded signals in response to a storage command from the common control. A series of gates are operatively connected to the codeable inputs to selectively transfer the coded signals to the series of codeable pairs of common select lines in response to a transfer signal from the common control. A series of detector circuits are each connected to one of the codeable pairs of common select lines to provide a unique code signal to the common control in response to a unique code on the common select lines. A gatable control circuit is connected to the common select lines to transfer coded signals on the common select lines to the common control in response to a read command signal from the common control.

The priority selector can be used in singular form or could be joined with other priority selectors to operate with a master system featuring a master priority selector functioning together with priority selector sub-systems each constructed in accordance with the invention herein.

The priority selector provides a highly desirable sequence and system for selection between a plurality of data elements selectively seeking priority recognition.

BEST MODE FOR CARRYING OUT THE INVENTION

Figure 1:
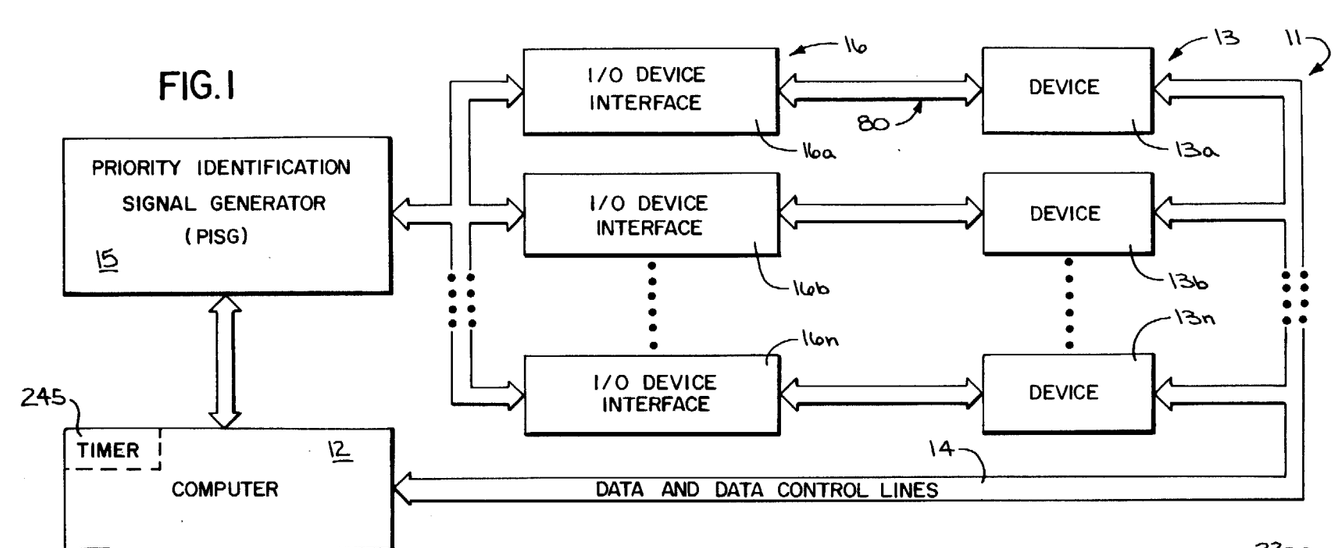
FIG. 1 is a block diagrammatical illustration of a computer coupled to a series of peripheral devices or elements through an input/output selection circuit including the subject invention.

A computing system 11 includes a computer 12 which may be selected from any one of a number of desirable, commercially available computers, such as for example and without limitation provided by Digital Equipment Corporation under the designation PDP-8 or PDP-11, or any specially built computer if desired. In any event, the computer 12 may include memory circuits together with logic circuits operable by software programs. If using the PDP-8, a six bit identification code may be desired because the PDP-8 features a twelve bit word length. A specially built computer could have its instruction set designed to take the fullest advantage of the characteristics of the invention set forth herein.

The computer 12 is electrically connected to a series of peripheral devices 13 which are individually designated as $13_a$, $13_b$ ... $13_n$, where n could be any letter or number corresponding to the total number of devices. In any event, the computer 12 is connected to devices 13 through a series of data and data control lines 14 connected in a conventional manner to send and receive data between computer 12 and devices 13. The devices 13 may include any one of a number of different items such as a typewriter keyboard, a visual screen, a communications input terminal, a telephone signal input, etc.

During the operation of computer 12, one or more of the devices 13 may request an interrupt indicating a need to either send or receive information via the data and data control lines 14. When computer 12 is in condition to communicate with the peripheral devices 13, it may face several interrupt requests from a number of devices 13.

In order to respond efficiently to the interrupt requests from the devices 13, the computer 12 functions with a priority identification signal generator (PISG) 15 which in turn communicates with the plurality of devices 13 through a series of I/O device interface circuits 16, which have been individually designated as $16_a$, $16_b$ ... $16_n$, where n could be any letter or number corresponding to the total number of interface circuits 16 which generally correspond with the number of devices 13. In operation, the priority identification signal generator 15 functions with the series of I/O interface circuits 16 to provide a priority identification sequence for selecting the highest priority device 13 seeking an interrupt.

The priority identification signal generator 15 (FIG. 2), is connected to computer 12 through a series of connecting circuits 17 which are electrically connected to the circuits of computer 12. Such coupling circuits 17 include sixteen device identification lines 18 which are selectively energized to provide a binary line identification code. Specifically, the identification lines labeled (0)–(7) provide an octally coded logic "1" line identification code while the identification lines labeled (8)–(15) provide an octally coded logic "0" line identification code. In the embodiment disclosed, the computer 12 functions with sixteen bits although it is understood that the principles of the subject invention may be employed with other bit configurations.

Figure 2:
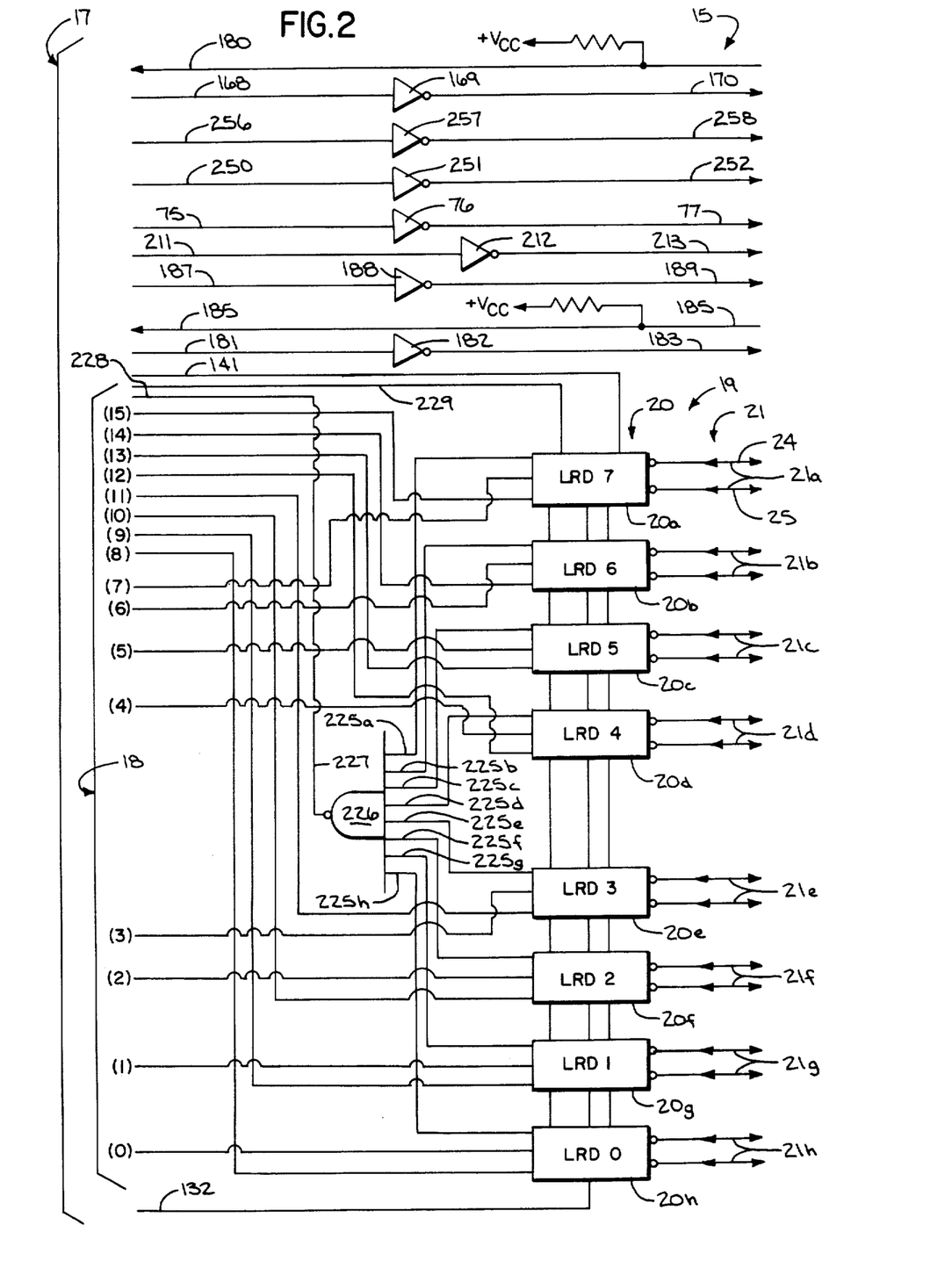
FIG. 2 is a circuit schematic of the priority identification signal generator of FIG. 1 and including a series of level select receiver-driver elements.

In any event, the device identification lines 18 are connected to a computer select circuit 19 which includes a series of level select receiver-driver elements 20, which have been specifically identified as elements $20_a$ through $20_h$. The output of the computer select circuit 19 includes a series of common select lines 21 which are connected in common to each of the I/O interface circuits 16. Specifically, the common select lines 21 are connected to individual select lines 23 provided by an identification circuit 22 for each of the I/O interface circuits 16 with each identification circuit 22 including a series of level select identification elements which are individually designated as $22_a$ through $22_h$. As an example, the level select receiver-driver element $20_a$ provides a pair of binary codeable lines $21_a$, including a higher priority circuit 24 and a lower priority circuit 25, which are connected to each of the I/O interface circuits 16. For example, the binary codeable circuit pair $21_a$ is connected in circuit with a binary codeable pair of circuits $23_a$ provided by the individual select lines 23 of the I/O interface circuit $16_a$. Naturally, the highest priority line 24 of the common select lines 21 is connected to a highest priority individual select line 26 of the individual select lines 23 while the lowest priority line 25 of the common select lines 21 is connected to a lowest priority individual select line 27 for each of the I/O interface circuits 16.

Figure 4:
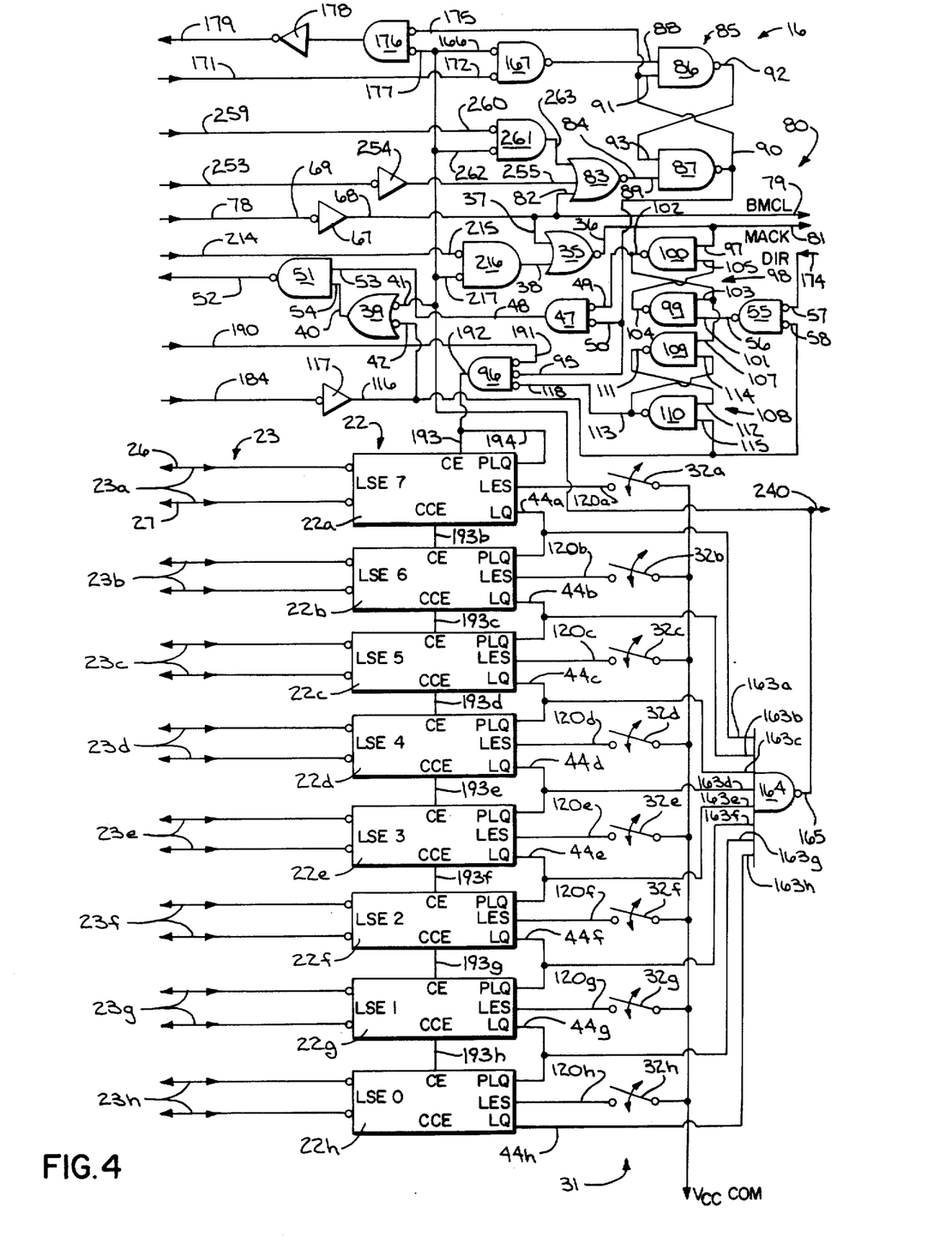
FIG. 4 is a schematic of one of the I/O device interface circuits of FIG. 1 and including a series of level select identification elements.

Hereafter, the specific construction and operation for the level select receiver-driver element $20_a$ and the level select identification element $22_a$ will be described in detail while it is understood that like elements $20_b$ through $20_h$ and $22_b$ through $22_h$ and are constructed and operate in a substantially identical manner.

A priority assignment circuit 31 (FIG. 4) includes a series of selectively operable switches $32_a$ through $32_h$ which are connected to the level select identification elements $22_a$ through $22_h$, respectively. Each of the switches 32 is selectively transferable between open and closed positions to selectively provide an assignment code to the identification circuit 22 for each of the interface circuits 16. The switches 32 can be either manually operated or automatically operated either remotely or through an output of the computer 12.

Standard TTL logic circuits are provided which will be described with logic symbols drawn in accordance with military specifications. For the simplicity of description, it is assumed that a logic "1" signal level will indicate a grounded circuit while a logic "0" signal level will indicate either a high circuit potential or an open circuit condition. The use of TTL logic circuitry as used in the manner shown herein provides "broken wire" protection particularly when such circuitry is interposed between outputs and inputs. It is understood that other signal levels could be appropriately employed along with corresponding logic to perform the same or substantially identical circuit operation.

As examples of logic operations, a Positive NOR 35 (FIG. 4) provides a logic "0" signal at an output 36 in response to a pair of logic "1" signals appearing at inputs 37 and 38. The appearance of a logic "0" signal at either input 37 or input 38 provides a logic "1" signal at output 36. A Negative NOR circuit 39 provides a logic "1" signal at an output 40 in response to logic "0" signals appearing at both of its input circuits 41 and 42. The appearance of a logic "1" signal at either input 41 or input 42 provides a logic "0" signal at output 40. A Positive OR circuit 43 (FIG. 5) provides a logic "1" signal at an output 44 in response to logic "1" signals appearing at both of its inputs 45 and 46. A logic "0" signal appearing at either input 45 or input 46 provides a logic "0" signal at output 44. A Negative NAND circuit 47 (FIG. 4) provides a logic "0" signal at an output 48 in response to a pair of logic "1" signals at both input circuits 49 and 50. The occurrence of a logic "0" signal at either input 49 or input 50 provides a logic "1" signal at output 48. A Positive NAND circuit 51 provides a logic "1" signal at an output 52 in response to logic "0" signals appearing at both of its inputs 53 and 54. The appearance of a logic "1" signal at either input 53 or input 54 provides a logic "0" signal at output 52. A Negative AND circuit 55 provides a logic "1" signal at an output 56 in response to logic "1" signals appearing at both of its inputs 57 and 58. The appearance of a logic "0" signal at either input 57 or input 58 provides a logic "0" signal at output 56. A Positive AND circuit 59 (FIG. 5) provides a logic "0" signal at an output 60 in response to logic "0" signals appearing at both of its inputs 61 and 62. The appearance of a logic "1" signal at either input 61 or 62 provides a logic "1" signal at output 60. An inverting circuit 67 (FIG. 4) provides a logic "1" signal at an output 68 in response to a logic "0" signal appearing at an input 69. In turn, inverter 67 provides a logic "0" signal at output 68 in response to a logic "1" signal appearing at input 69. It is understood that other logic elements shown as the elements described above all operate in an identical manner.

For initialization of the system, the computer 12 provides a logic "0" signal to a master clear line 75 provided by the priority identification signal generator 15. Such logic "0" master clear signal may be supplied during the initial power on pulse supplied by computer 12 or could be a software initiated pulse. In any event, the logic "0" master clear signal at input 75 only momentarily appears and then reverts to the logic "1" status. An inverter 76 responds to the logic "0" master clear signal at input 75 and provides a logic "1" master clear signal at an output circuit 77. The output circuit 77 of the priority identification signal generator 15 is connected in common to each of the individual master clear leads 78 provided by the I/O interface circuits 16.

Each inverter 67 provided by the plurality of interface circuits 16 responds to the logic "1" master clear signal at the input 78 to provide a logic "0" signal at output 68 which is supplied to the respective device 13 to furnish a buffered master clear (BMCL) signal at an output lead 79 of a coupling circuit 80. Such logic "0" buffered master clear signals are used by the devices 13 to initialize their logic circuits. The logic "0" signal is also applied to the Positive NOR circuit 35 to provide a logic "1" master clear/acknowledge interrupt request (MACK) signal at output 36 which is supplied to the respective device 13 through a circuit lead 81 of coupling circuit 80. In such manner, the logic "1" master clear/acknowledge interrupt request signals are also used by the respective devices 13 for resetting their circuits during an initialization sequence. As set forth hereinafter, the "MACK" signal will also be utilized in other sequences for acknowledging the receipt of an interrupt request.

The logic "0" "BMCL" signal is also supplied to an input 82 of a Positive NOR circuit 83 which functions to provide a logic "1" signal at an output circuit 84 which, in turn, is connected to reset an enable latch 85. The enable latch 85 includes a pair of Positive NAND gates 86 and 87 which are interconnected in a set-reset latch arrangement. A set input 88 is connected to Positive NAND 86 while a reset input 89 is connected to Positive NAND 87. An output circuit 90 of Positive NAND 87 is connected to an input 91 of Positive NAND 86. An output 92 of Positive NAND 86 is connected to an input 93 of the Positive NAND 87. With such construction, the logic "1" signal provided by the Positive NOR 83 will reset the enable latch 85 to provide a logic "0" signal at the output 90.

The logic "0" signal at output 90 of the enable latch 85 is supplied to input 50 of the interrupt request gate 47 and to an input 95 of a common enable gate 96 to thereby initialize both of the gates 47 and 96 during the initial power-on sequence.

The logic "1" MACK signal appearing at output 36 of the Positive NOR circuit 35 is also supplied to a reset input 97 of an interrupt latch 98. The interrupt latch 98 is constructed in a set-reset latch configuration through the inter-connection of two Positive NAND gates 99 and 100. The output 56 of the isolation gate 55 is connected to an input 101 of gate 99 while the resetting input 97 is connected to the gate 100. An output 102 of gate 100 is connected to input 49 of the interrupt request gate 47 and is also connected to an input 103 of gate 99. An output 104 of gate 99 is connected to an input 105 of gate 100. The logic "1" MACK signal supplied to input 97 provides a logic "0" signal at output 102 which, in turn, is supplied to input 49 of the interrupt request gate 47 and to an input 107 of a sequence latch 108.

The sequence latch 108 includes a pair of Positive NAND gates 109 and 110 connected in a set-reset latch configuration wherein an output 111 of gate 109 is connected to an input 112 of gate 110 while an output 113 of gate 110 is connected to an input 114 of gate 109. An input 115 of gate 110 is connected to an output 116 of an inverter 117. The logic "0" signal supplied at output 102 of the interrupt latch 98 is applied to input 107 of the sequence latch 108. During initialization however, the inverter 117 maintains a logic "1" signal at output 116 which, in turn, is supplied to input 115 so as to maintain a logic "0" signal to an input 118 of the common enable gate 96.

Upon completion of the initial power-on (master clear) pulse, the enable latch 85 maintains logic "0" signals at input 50 of the interrupt request gate 47 and at input 95 of the common enable gate 96. The interrupt latch 98 was reset to provide a logic "0" signal at input 49 of the interrupt request gate 47. The sequence latch 108 maintains a logic "0" signal at input 118 of the common enable gate 96. The BMCL and MACK signals initialize the devices 13.

The priority assignment circuits 31 for each of the I/O interface circuits 16 are selectively operated to encode the devices 13 for priority selection purposes. For example, if device 13$_a$ is to be awarded the highest priority in the device selection process, all of the switches 32$_a$ through 32$_h$ are operated to an open condition to provide logic "0" signals to corresponding input circuits 120$_a$ through 120$_h$ for the level select identification elements 22$_a$ through 22$_h$, respectively. On the other hand, if device 13$_a$ is to be awarded the second highest priority in the selection process, all of the switches 32$_a$ through 32$_g$ are opened while switch 32$_h$ is closed. With the second highest priority, logic "0" signals are supplied to input leads 120$_a$ through 120$_g$ of the level select identification elements 22$_a$ through 22$_g$, respectively, while a logic "1" signal is supplied at input 120$_h$ of level select identification element 22$_h$. In any event, the switches 32$_a$ through 32$_h$ are selectively opened or closed to award a priority basis to each of the plurality of devices 13. Also in such manner, each device 13 is assigned a binary identification code, with the bit corresponding to switch 32$_a$ being the most significant and the bit corresponding to bit 32$_h$ the least significant. The switches 32$_a$ through 32$_h$ can be selectively operated to either open or closed conditions under any operating format for providing an encoded priority basis, such as in a binary sequence for example.

Figure 3:
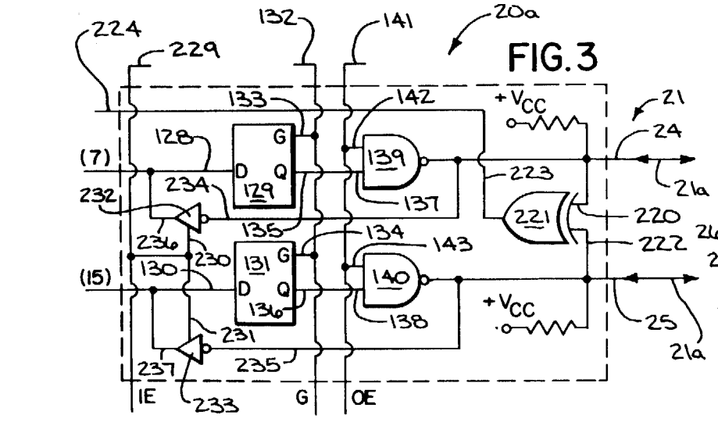
FIG. 3 is a circuit schematic of one of the level select receiver-driver elements of FIG. 2.

The computer 12 through its initialization program or the like provides an enable sequence by loading the code for all devices 13 into the level select receiver-driver elements 20 of the priority identification signal generator 15. Specifically, the computer 12 provides logic "0" signals to all device identification lines 18 which are applied to all of the level select receiver-driver elements 20. FIG. 3 illustrates the circuit construction for the level select driver element 20$_a$ and it is understood that receiver-driver elements 20$_b$ through 20$_h$ are constructed and operate in an identical manner.

The logic "0" signal appearing on the device identification line labeled (7) is applied to a "D" input 128 of a D-type latch 129 while the logic "0" signal appearing at the device identification line labeled (15) appears at a "D" input 130 of a D-type latch 131. The computer 12 simultaneously gates all of the D-type latches, such as 129 and 131, for all of the level select receiver-driver elements 20 by supplying a logic "0" signal at a gate circuit 132. Such logic "0" signal is supplied to all of the gate inputs, such as gates 133 and 134 for the D-type latches 129 and 131, respectively, so that all of the D-type latches will provide a logic "0" signal at the "Q" outputs, such as at outputs 135 and 136 of the D-type latches 129 and 131, respectively. Such logic "0" signals provided by the D-type latches 129 and 131 are supplied to inputs 137 and 138 of Positive NAND gates 139 and 140, respectively. The computer 12 provides an output enable logic "0" signal to a circuit 141 which is connected to input circuits 142 and 143 of the Positive NAND circuits 139 and 140, respectively, and to similarly constructed Positive NAND circuits in the other level select receiver-driver elements 20$_b$ through 20$_h$.

The NAND circuits 139 and 140 respond to the logic "0" output signals provided by the D-type latches 129 and 131 and the logic "0" output enable signal on circuit 141 supplied by computer 12 to provide logic "1" output signals to the output circuits 24 and 25, respectively.

Thus, all of the common select lines 21 provide logic "1" signals in response to the computer 12 subjecting the device identification lines 18, the gating signal line 132 and the output enable signal line 141 with logic "0" signals.

In such manner, the individual select lines 23 for all of the devices 13 receive logic "1" inputs from the priority identification signal generator 15.

With the level encoding switch 32$_a$ in an open condition, a logic "0" signal is supplied to the level select identification element 22$_a$ (FIG. 5) via the input lead 120$_a$. The logic "1" signal appearing at the individual select line 26 is supplied to an input 145 of an inverter 146 which, in turn, supplies a logic "0" signal at an output 147. Such logic "0" signal provided by inverter 146 appears at an input 148 of a Positive AND circuit 149. An input 150 of gate 149 is connected to circuit lead 120$_a$ and is at a logic "0" level in response to the open condition of switch 32$_a$ signifying a high priority designation (i.e. the most significant device identification bit corresponding to a binary logic "1"). With logic "0" signals appearing at inputs 148 and 150, the Positive AND circuit 149 provides a logic "0" signal to the input 45 of the Positive OR 43. The Positive OR 43, in turn, responds to the logic "0" signal at input 45 and provides a logic "0" signal at the output 44 to indicate that the level select identification element 22$_a$ is in a qualified condition.

Figure 5:
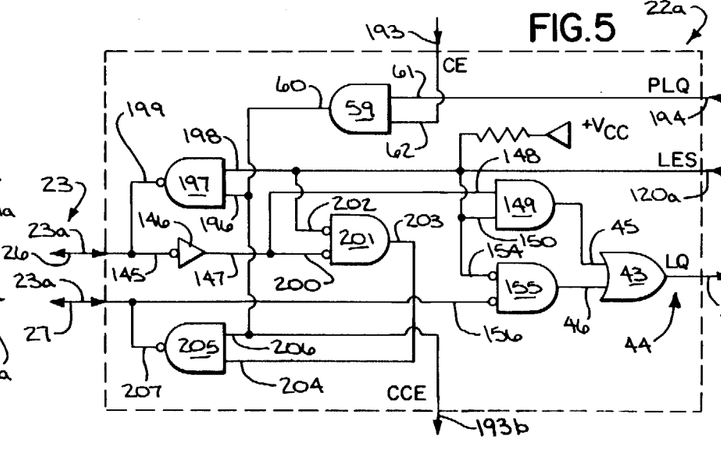
FIG. 5 is an electrical circuit schematic of one of the level select identification circuits of FIG. 4.

If the level select identification element 22$_a$ is preset at a lower priority (i.e. the most significant device identification bit corresponding to a binary logic "0") by placing switch 32$_a$ in a closed condition, a logic "1" signal is supplied on input lead 120$_a$ which appears at an input circuit 154 of a Negative NAND gate 155. The logic "1" signal at the individual select line 27 is supplied to an input 156 of gate 155. With logic "1" signals at both inputs 154 and 156, the gate 155 supplies a logic "0" signal to the input 46 of the gate 43. In such manner, the Positive OR circuit 43 responds to the logic "0" at input 46 to provide a logic "0" signal at output 44 indicating that the level select identification element 22$_a$ is in a qualified condition.

If all of the level select identification elements 22$_a$ through 22$_h$ are enabled and working properly, logic "0" signals appear at the output circuits 44$_a$ through 44$_h$ and therefore at inputs 163$_a$ through 163$_h$ of a Positive NAND gate 164. With all inputs at a logic "0" level, the Positive NAND 164 provides a logic "1" signal at an output 165 which indicates that device 13$_a$ is qualified (i.e. selected). In that the computer 12 has loaded the codes for all devices 13 into the priority identification signal generator 15, all of the individual select lines 23 are energized so that all of the interface circuits 16 will consider themselves qualified (i.e. selected).

The logic "1" device qualified signal appearing at output 165 of the Positive NAND gate 164 is supplied to an input 166 of a Negative AND circuit 167. During the enable sequence, the computer 12 generates an enable signal by supplying a logic "0" signal at an input 168 to an inverter 169 which, in turn, supplies a logic "1" signal at a common output circuit 170. Such logic "1" signal provided by the inverter 169 is supplied to all of the I/O interface circuits 16 and specifically to their individual enable circuits 171 so that the logic "1" enable signal will appear at an input 172 of the Negative AND circuit 167. With logic "1" signals appearing at inputs 166 and 172, the Negative AND circuit 167 provides a logic "1" output to the input 88 to set the enable latch 85. In such manner, the enable latch 85 changes states to provide a logic "1" signal at output 90 which is supplied as a preconditioning signal to input 50 of the interrupt request gate 47 and input 95 of the common enable gate 96. Further, the logic "1" signal at output 90 is supplied to an input 175 of a Negative NAND circuit 176. The logic "1" device qualified signal provided by output 165 of gate 164 is also provided to an input 177 so that the device enabled gate 176 responds to provide a logic "0" output to an inverter 178. The inverter 178, in turn, supplies a logic "1" signal to an individual output lead 179 which is connected to a common device enabled line 180 of the priority identification signal generator 15. In such manner, the logic "1" signal is supplied through the common circuit 180 to the computer 12 to indicate that at least one of the I/O interface circuits 16 has been enabled and is in condition to respond to interrupt requests from associated devices 13.

The computer 12 responds to the logic "1" device enabled signal received at the common circuit 180 to provide a logic "1" signal upon the output enable circuit 141 to disable all of the level select receiver-driver elements 20 by disabling the corresponding output enable gates, i.e. 139 and 140 (FIG. 3). In such manner, all of the logic "1" signals will be removed from the common select lines 21 and interconnected individual select lines 23 for all of the interface circuits 16. In such condition, the individual select lines 23 for the I/O interface circuits 16 appear as open collector circuits. The inverter 146 (FIG. 5) responds to the logic "0" at the individual select line 26 to provide a logic "1" at output 147 which, in turn, is supplied to input 148 of the Positive AND 149. The Positive AND circuit 149 responds to provide a logic "1" signal to input 45 of the Positive OR 43. The Negative NAND 155 responds to a logic "0" at input 156 to provide a logic "1" to input 46. With logic "1" signals at inputs 45 and 46, the Positive OR circuit 43 provides a logic "1" at output 44$_a$ which is supplied to the Positive NAND circuit 164. With all of the individual select lines 23 in an open collector logic "0" condition, logic "1" signals appear at all inputs 163$_a$ through 163$_h$ and the Positive NAND circuit 164 responds to provide a logic "0" at output 165 in each of the interface circuits 16. With such sequence, none of the interface circuits 16 considers themselves selected.

In lieu of a mass enable as above described, computer 12 could, if desired, address each device 13 individually and confirm that such addressed device 13 has been enabled by monitoring the device enabled line 180. Either mass enable or individual enable may be used by computer 12 depending upon the preferences of the system programmer. Obviously, mass enable will provide rapid utilization particularly when used with a large system employing many peripherals. Where mass enable is utilized, individual device enable can be confirmed by computer 12 at a later time by addressing each device 13 separately when the computer 12 is not otherwise being utilized.

Upon completing the mass or individual enable sequence, the computer 12 may continue with its on-line program and pre-condition its internal interrupt sensor circuit for subsequent operation.

When the system has been conditioned for normal operation, as above described, the computer 12 provides a logic "1" signal to an enable code find circuit 181. Furthermore, an inverter 182 responds to the logic "1" signal at the enable code find circuit 181 to provide a logic "0" signal at a common enable code find output circuit 183. Such logic "0" signal at the common enable code find circuit 183 appears at all of the individual enable code find circuits 184 for the I/O interface circuits 16. Such logic "0" signal is inverted by inverter 117 to provide a logic "1" signal to input 58 of the isolation gate 55.

When one of the devices 13, such as device 13$_a$ for example, seeks to communicate with computer 12, it will issue an interrupt request by supplying a logic "1" device interrupt request (DIR) signal at an input circuit 174 which is supplied to input 57 of the isolation gate 55. With logic "1" signals at inputs 57 and 58, the isolation gate 55 provides a logic "1" at output 56 to set the interrupt latch 98 which, in turn, provides a logic "1" signal at output 102. With logic "1" signals appearing at inputs 49 and 50, the interrupt request gate 47 provides a logic "0" at output 48 which, in turn, appears at input 53 of the interrupt request interlock 51. The logic "1" signal at output 116 of inverter 117 also appears at input 42 of the Negative NOR 39 to maintain a logic "0" signal at input 54. With logic "0" signals at inputs 53 and 54, the Positive NAND circuit 51 provides a logic "1" signal at the individual output 52 which is supplied to computer 12 through a common interrupt request circuit 185. In such manner, the logic "1" signal appearing at the common interrupt request circuit 185 indicates to the computer that at least one of the devices 13 is requesting an interrupt.

Upon sensing an interrupt request, the computer 12 initiates a code find sequence to determine which one of the devices 13 is seeking an interrupt or, where a plurality of devices is seeking an interrupt, to determine and select one of the requesting devices according to the assigned highest priority. To initiate a code find sequence, the computer 12 issues a logic "0" enable code find signal at circuit 181 which causes in inverter 117 to provide a logic "0" signal at input 58 for all of the I/O interface circuits 16 to disable all of the isolation gates 55 corresponding to all devices. In such manner, the request system is frozen and a priority selection is made with respect to previously existent interrupt requests. The logic "0" signal from inverter 117 also appears at input 42 and the Negative NOR 39 responds to provide a logic "1" signal to input 54 to effectively disable the interrupt request interlock 51 for each of the I/O interface circuits 16. In such manner, the I/O interface circuits 16 are unable to energize the interrupt request circuit 52 until the code find sequence determines that at least one device has qualified for selection.

The logic "0" signal from inverter 117 is also supplied to input 115 of sequence latch 108 thereby removing the previously existing logic "1" at input 115 which had maintained the sequence latch 108 in a disable reset condition. In such manner, the sequence latch 108 is conditioned to respond the interrupt latch 98, and particularly to a logic "1" at output 102. The sequence latch 108 responds to the logic "1" signal at input 107 to provide a logic "1" signal to input 118 of the common enable gate 96.

Also during the code find sequence, the computer 12 provides a logic "0" signal at a general enable input circuit 187. An inverter 188, in turn, provides a logic "1" signal at a common general enable circuit 189 which is connected to all of the individual general enable circuits 190 provided by the I/O interface circuits 16. In such manner, a logic "1" signal appears at an input 191 of the common enable gate 96.

The common enable gate 96 thus receives logic "1" signals at all of its inputs 95, 118 and 191 and provides a logic "0" signal to an output circuit 192 connected to the level select identification element 22$_a$ of the identification circuit 22.

The supply of a logic "0" signal at output 192 of the common enable gate 96 enables the identification circuits 22 only for the I/O interface circuits 16 which correspond with the devices 13 initiating the interrupt requests. Specifically, the enable logic "0" signal from output 192 of gate 96 is supplied to the level select identification element $22_a$ through an enable circuit 193. With reference to FIG. 5, the logic "0" signal is connected to input 62 of the Positive AND circuit 59. In that the level select identification element $22_a$ is the highest level element in the series of elements $22_a$ through $22_h$, the input 61 of Positive AND 59 is also connected to the enable lead 193 through a connecting circuit 194. For subsequent level select identification elements $22_b$ through $22_h$, the input 61 of the Positive AND circuit 59 is connected to a higher level output 44 while the input 62 is connected to a higher level output 60, as explained in greater detail hereafter.

With respect to the level select identification element $22_a$, logic "0" signals appear at both inputs 61 and 62 and the Positive AND 59 provides a logic "0" at output 60. Such logic "0" signal appears at an input 196 of a Positive NAND circuit 197. Assuming that the level select identification element $22_a$ is programmed to be of the highest priority, switch $32_a$ is open to supply a logic "0" signal through input lead $120_a$ to an input 198 of gate 197. With logic "0" signals at inputs 196 and 198, the Positive NAND gate 197 provides a logic "1" to the select line 26 through the output circuit 199. Such logic "1" signal at the individual select line 26 is inverted by inverter 146 to provide a logic "0" signal to input 148 of the Positive AND 149. With switch $32_a$ open, a logic "0" will also appear at input 150 and Positive AND gate 149 will provide a logic "0" signal to input 45. The Positive OR 43 responds to provide a logic "0" at output $44_a$ indicating that level select identification element $22_a$ is level qualified at the highest priority. With switch $32_a$ open, the level select identification element $22_a$ provides a logic "1" signal at the individual select line 26.

If the level select identification element $22_a$ is programmed to be of a lower priority, switch $32_a$ is closed thereby supplying a logic "1" signal to input 198 of the Positive NAND 197 to produce a logic "0" signal at the individual select line 26. If no other interface circuit 16 places a logic "1" on its select line 26, the inverter 146 responds to the logic "0" signal at select line 26 to provide a logic "1" signal to an input 200 of a Negative NAND circuit 201. An input 202 of gate 201 is connected to the input circuit $120_a$. With the level select element $22_a$ programmed for a lower priority, i.e. switch $32_a$ closed, logic "1" signals appear at both inputs 200 and 202 and Negative NAND 201 provides a logic "0" signal at an output 203. Such logic "0" signal is supplied to an input 204 of a Positive NAND circuit 205. An input 206 of gate 205 is connected to the output 60 of the Positive AND circuit 59. With logic "0" signals at both inputs 204 and 206, the Positive NAND 205 provides a logic "1" signal at the individual select line 27 through the output circuit 207. Such logic "1" signal at select line 27 is supplied to input 156 of the Negative NAND circuit 155. In that switch $32_a$ is closed, a logic "1" signal exists at input 154 of the Negative NAND 155. With logic "1" signals appearing at both inputs 154 and 156, the Negative NAND 155 provides a logic "0" signal to input 46 resulting in the Positive OR 43 providing a logic "0" at output $44_a$ indicating that the level select identification element $22_a$ is level qualified even though it has been assigned a lower priority. Under such circumstances, a logic "0" signal exists on individual select line 26 while a logic "1" signal exists on individual select line 27 representing a lower priority recognition code for the level select identification element $22_a$ with switch $32_a$ in an open condition.

As previously stated, the individual select lines 26 and 27 are connected in common with other similarly situated individual select lines for the other interface circuits, i.e. $16_b \ldots 16_n$. In other words, the individual select line 26 for the interface circuit $16_a$ is not only connected to the common select line 24 of the priority identification signal generator 15, but also is connected to the individual select line provided by each of the interface circuits $16_b \ldots 16_n$ which correspond to the individual select line 26 for interface circuit $16_a$.

Thus, if an interface circuit, i.e. $16_b \ldots 16_n$, other than interface circuit $16_a$ is assigned a high priority for its upper most level select identification element corresponding to element $22_a$, i.e. through an open priority assignment switch corresponding to $32_a$, and is responding to an interrupt request from its corresponding device, the level select identification element $22_a$ for interface circuit $16_a$ will see a logic "1" signal at the individual select line 26 and an open collector logic "0" signal at individual select line 27.

If the level select element $22_a$ for interface circuit $16_a$ is encoded for a lower priority by the closing of switch $32_a$, the level select identification element $22_a$ responds to a logic "1" signal at the individual select line 26 supplied from another higher priority interface circuit, i.e. $16_b \ldots 16_n$, to provide a logic "1" signal at output $44_a$ to indicate that such level for interface circuit $16_a$ is not qualified for priority selection purposes. Specifically, the logic "1" signal at the individual select line 26 is inverted by inverter 146 to provide a logic "0" signal at output 147. The Negative NAND 201 responds to the logic "0" signal at input 200 to provide a logic "1" signal at output 203. The Positive NAND circuit 205 responds to the logic "1" signal at input 204 to allow an open collector logic "0" signal at output 207. The Negative NAND 155 responds to the logic "0" at input 156 to provide a logic "1" signal at input 46 for the Positive OR 43. The Positive AND 149 responds to a logic "1" signal at input 150 provided by the closed switch $32_a$ to provide a logic "1" signal to input 45. With logic "1" signals at inputs 45 and 46, the Positive OR 43 provides a logic "1" at output $44_a$ indicating that the level select identification element $22_a$ is not qualified for priority selection. This means that a corresponding level in one or more interface circuits, i.e. $16_b \ldots 16_n$, has a higher assigned priority and its corresponding device, i.e. $13_b \ldots 13_n$, has issued an interrupt request.

If the level select identification element $22_a$ is programmed for the higher priority by the opening of switch $32_a$, it will provide a logic "0" signal at output $44_a$ indicating that element $22_a$ is level qualified for priority selection notwithstanding the fact that other corresponding levels in other interface circuits, i.e. $16_b \ldots 16_n$, have also generated a corresponding level qualified signal vying for priority selection. In such situation, logic "1" signals appear at the individual select lines 26 for each level qualified element in all of the interface circuits 16 vying for priority selection, such as provided by the Positive NAND 197 for the element $22_a$ and like circuits in the other interface circuits. The inverter 146 responds to the logic "1" signal at the individual select line 26 to provide a logic "0" signal at input 148 of the Positive AND 149. In that switch $32_a$ is open indicating a higher priority designation for element $22_a$, a logic "0" signal appears at input 150 of Positive AND 149. With logic "0" signals at inputs 148 and 150, the Positive AND 149 provides a logic "0" signal to input 45 and Positive OR 43 provides a logic "0" signal at output $44_a$ indicating that element $22_a$ is level qualified for priority selection.

Figure 6:
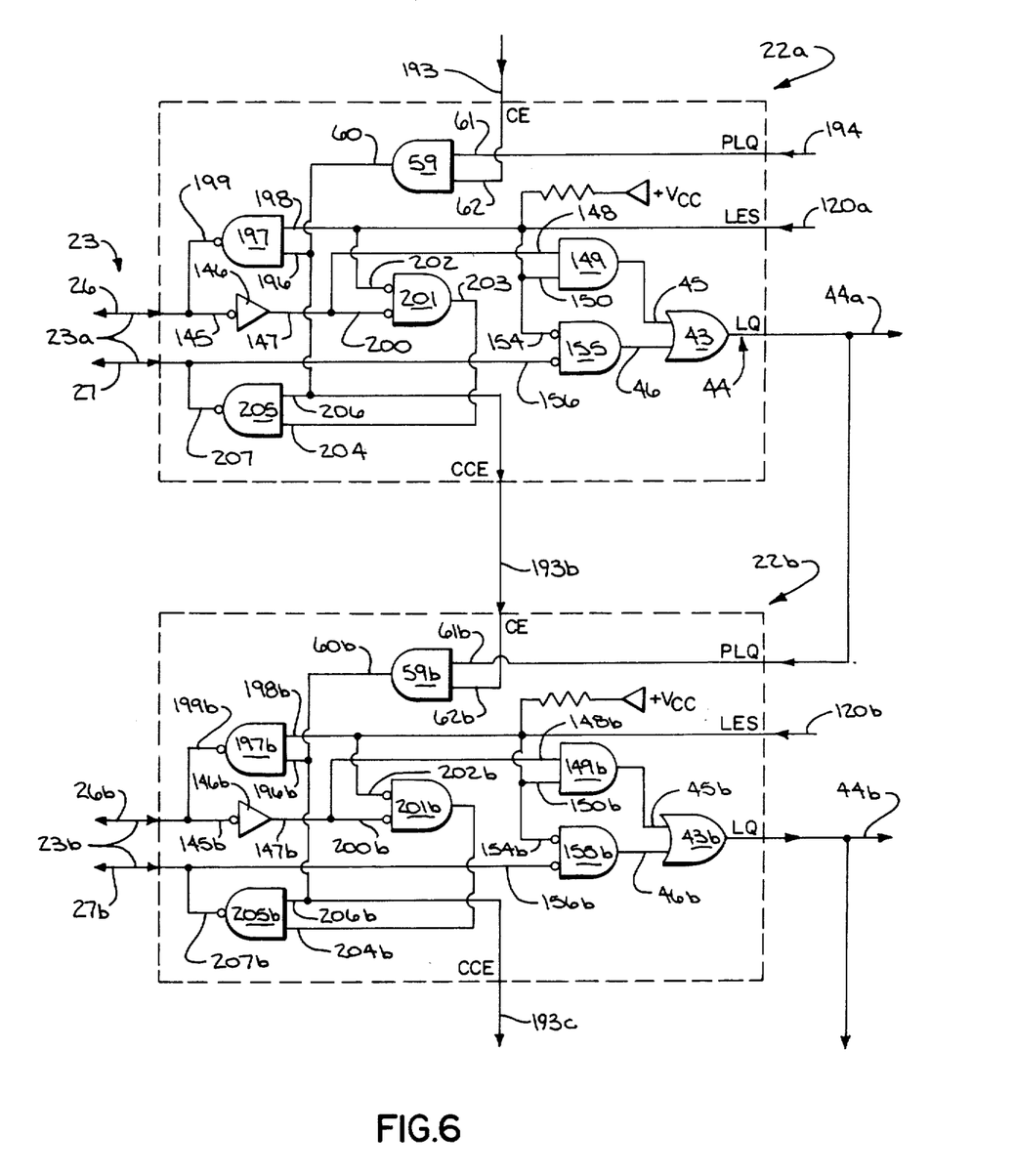
FIG. 6 is an electrical circuit schematic of two level select identification circuits including the circuit of FIG. 5.

If the level select identification element $22_a$ is level qualified, the logic "0" signal at output $44_a$ is supplied to input $61_b$ of a Positive AND $59_b$ for the level select identification element $22_b$ (FIG. 6). Further, a cascaded common enable logic "0" signal is supplied to input $62_b$ of Positive AND $59_b$ from output 60 of the Positive AND 59 via the enable circuit $193_b$. With logic "0" signals at both inputs $61_b$ and $62_b$, the Positive AND $59_b$ provides a logic "0" at output $60_b$ which, in turn, is supplied to input $196_b$ for Positive NAND $197_b$. If element $22_b$ is encoded for the highest priority, switch $32_b$ is open and a logic "0" signal is supplied to input $198_b$ of Positive NAND $197_b$. With logic "0" signals at inputs $196_b$ and $198_b$, the Positive NAND $197_b$ provides a logic "1" signal to the individual select line $26_b$ through its output circuit $199_b$. The inverter $146_b$ responds to the logic "1" signal on the individual select line $26_b$ and provides a logic "0" signal to input $148_b$ of Positive AND $149_b$. With switch $32_b$ open, a logic "0" signal is supplied to input $150_b$ and Positive AND $149_b$ provides a logic "0" to input $45_b$ of Positive OR $43_b$. In such manner, a logic "0" signal is provided at output $44_b$ for the level select identification element $22_b$ indicating that both of the elements $22_a$ and $22_b$ are level qualified. The logic "0" signal at output $44_b$ is, in turn, supplied to the input $61_c$ of the Positive AND $59_c$ for the level select identification element $22_c$.

If level $22_a$ is not qualified, the logic "1" signal at output $44_a$ is supplied to input $61_b$ of Positive AND $59_b$. The Positive AND $59_b$ responds to the logic "1" at input $61_b$ to provide logic "1" signals to inputs $196_b$ and $206_b$ of the Positive NAND circuits $197_b$ and $205_b$, respectively. The Positive NAND circuits $197_b$ and $205_b$ respond to provide logic "0" signals at the individual select lines $26_b$ and $27_b$. The inverter $146_b$ responds to the logic "0" signal at the individual select line $26_b$ to provide a logic "1" signal at input $148_b$ of the Positive AND $149_b$ which, in turn, provides a logic "1" signal at input $45_b$. The Negative NAND $155_b$ responds to the logic "0" signal at input $156_b$ to provide a logic "1" signal at input $46_b$. With logic "1" signals at inputs $45_b$ and $46_b$, the Positive OR $43_b$ provides a logic "1" signal at output $44_b$ indicating that element $22_b$ is not level qualified for priority selection. With levels $22_a$ and $22_b$ not qualified for priority selection, output $44_b$ of Positive OR $43_b$ provides a logic "1" signal to input $61_c$ of Positive AND $59_c$ while output $60_b$ of Positive AND $59_b$ provides a logic "1" signal to input $62_c$ via enable circuit $193_c$. With a logic "1" signal at either of the inputs $61_c$ or $62_c$, the Positive AND $59_c$ responds to provide a logic "1" signal at output $60_c$. In such manner, the disqualification of a particular level will disable lesser significant levels via the interconnecting enable circuits (i.e. $193_c$ . . . $193_h$). Such disabling of lesser significant levels associated with a lower priority device 13 prevents such device from re-entering the priority selection process at a lesser significant level (i.e. $22_c$ . . . $22_h$). In such manner, all subsequent level select identification elements $22_c$ through $22_h$ are prevented from assigning a code to their respective individual select lines.

If the device $13_a$ has sought an interrupt request and possesses the highest assigned priority with respect to all other devices seeking an interrupt request, logic "0" signals appear at all of the inputs $163_a$ through $163_h$ of the Positive NAND 164. A logic "1" signal is provided at output 165 of Positive NAND 164 indicating that device $13_a$ is qualified and possesses the highest assigned priority of all devices seeking an interrupt. The corresponding outputs 165 for Positive NANDs 164 for all other interface circuits 16 corresponding to devices seeking an interrupt provide a logic "0" signal indicating that such devices are not privileged or qualified with the highest priority seeking an interrupt.

With all levels qualified for interface circuit $16_a$, the logic "1" signal at output 165 is supplied to input 41 of Negative NOR 39. The Negative NOR 39, in turn, responds to the logic "1" at input 41 to provide a logic "0" to input 54 of the interrupt request interlock 51. The previous setting of the interrupt latch 98 operatively established a logic "0" signal at input 53. With logic "0" signals at inputs 53 and 54, the Positive NAND 51 provides a logic "1" signal at output 52 which, in turn, is connected to the common interrupt request circuit 185. Such logic "1" signal at line 185 during the code find sequence indicates to the computer 12 that all levels of one interface circuit 16 have qualified for highest priority selection.

When a level select identification element 22 has been qualified for highest priority, one of the individual select lines 26 and 27 will have a logic "1" signal and the other will have a logic "0" signal depending on whether such individual qualified levels i.e. $22_a$, was preprogrammed to have an assigned high level by the opening of switch $32_a$ or a low level by the closure of switch $32_a$. For example, a logic "1" signal at the individual select line 26 appears at the common select line 24 while a logic "0" signal at individual select line 27 appears at the common select line 25. The logic "1" signal at the common select lead 24 appears at an input 220 (FIG. 3) of an Exclusive OR circuit 221 while the logic "0" signal at common select lead 25 appears at input 222 of the Exclusive OR 221. With a logic "1" signal at one of the inputs 220 or 222 and a logic "0" signal at the other input, the Exclusive OR 221 provides a logic "0" signal at an output 223 which is supplied through a connecting circuit 224 to an input $225_a$ of a Positive NAND circuit 226. In that both logic "1" and logic "0" signals appear at all of the pairs of common select lines $21_a$ through $21_h$, the Exclusive OR's $221_a$ through $221_h$ commonly provide logic "0" signals to the inputs $225_a$ through $225_h$ of the Positive NAND 226. With logic "0" signals at all of its inputs, the Positive NAND 226 provides a logic "1" signal at an output 227 which is supplied to computer 12 through a connecting circuit 228. Such logic "1" signal at circuit 228 informs the computer 12 that a unique code exists at one of the interface circuits 16 for a device 13 seeking an interrupt.

Upon receiving a logic "1" signal at input circuit 228 indicating that a unique code exists, computer 12 provides a logic "0" gating signal through an input enable circuit 229 which is supplied to all of the level select receiver-driver elements 20. Specifically, the logic "0" gating signal is supplied to individual gate inputs 230 and 231 of associated gates or switches 232 and 233, respectively. An input 234 of switch 232 is connected to the common select line 24 while an input 235 of gate 233 is connected to the common select line 25. An output 236 of gate 232 is connected to one of the device identification lines 18, i.e. the line identified (7), while an output 237 of gate 233 is connected to one of the device identification lines 18, i.e. the line designated (15). The supply of a logic "0" at inputs 230 and 231 render the three-state gates 232 and 233 conductive to thereby communicate the logic signals appearing at the common select lines 24 and 25 to the device identification lines designated (7) and (15). In such manner, all of the coded inputs appearing at the common select lines 21 are gated into computer 12 through the device identification lines 18 so that computer 12 may precisely identify which device 13 and associated interface circuit 16 is seeking an interrupt having the highest assigned priority code.

The computer 12 therefore sees a logic "1" signal at input circuit 185 and a logic "1" signal at input circuit 228 which indicates to the computer that one of the interface circuits 16 corresponding to a device 13 seeking an interrupt and having the highest priority designation has been appropriately selected by the identification circuits 22. Furthermore, computer 12 can read the code on the device identification lines 18 to thereby specifically determine the device 13 seeking an interrupt which has been selected by the interface circuit 16 to be of the highest assigned priority. Furthermore, such unique device code can be gated by computer 12 into the series of D-type latches, i.e. 129 and 131, by submitting a gating pulse through circuit 132 to thereby retain the unique code within such latch circuits.

Once the unique code of the highest priority device seeking interrupt has been determined, the computer 12 can acknowledge such interrupt at any time.

The computer 12 responds to a received qualified signal and provides a logic "0" signal on a common acknowledge line 211. An inverter 212 responds to the logic "0" at circuit 211 to provide a logic "1" signal to a common acknowledge output circuit 213. Such logic "1" signal is supplied to all of the individual acknowledge circuits 214 provided by the interface circuits 16. Such logic "1" signal at circuit 214 (FIG. 4) is supplied to an input 215 of a Negative NAND circuit 216. An input 217 of Negative 216 is connectd to the output 165 of the Positive NAND 164, which is at a logic "1" level during the acknowledge sequence. With logic "1" signals at both inputs 215 and 217, Negative NAND 216 provides a logic "0" signal to input 38 of the Positive NOR 35. With a logic "0" at input 38, the Positive NOR 38 provides a logic "1" MACK signal at lead 81 which is supplied to device 13$_a$ to inform device 13$_a$ that it has been selected as the highest priority device and may reset its internal interrupt request latch or element.

The logic "1" MACK signal at output 36 of Positive NOR 35 is also supplied to input 97 of the interrupt latch 98. In such manner, the interrupt latch 98 is reset to provide a logic "0" at output 102 which, in turn, is supplied to input 49 of the interrupt request gate 47. With logic "0" at input 49, the interrupt request gate 47 provides a logic "1" signal to input 53 of the interrupt request driver 51 which, in turn, responds to provide a logic "0" at output 52. Such logic "0" signal is supplied to the computer 12 through the common circuit 185 to indicate to the computer 12 that the priority selection has been acknowledged to the device 13$_a$. Further, the logic "1" signal provided at output 165 of Positive NAND 164 which indicates that device 13$_a$ is qualified and possesses the highest assigned priority of all devices seeking an interrupt is communicated to device 13$_a$ through an output circuit 240 and used as an interlock signal to enable data transfer.

As indicated previously, the purpose of the interrupt request is to inform computer 12 that a device 13 is in condition to receive data (i.e. printer for example) or send data (i.e. keyboard for example). Once computer 12 identifies a highest priority (qualified) device 13 seeking an interrupt, it will enter an interrupt service program designed for the qualified device 13 to effectuate data transfer. Such data transfer may occur either before or after the interface circuit 16 sends the logic "1" MACK signal via lead 81 at the discretion of the system designer.

When computer 12 wishes to release the code latched by the code find sequence, it removes the logic "0" signal at circuit lead 181 which thereby transfers to a logic "1" signal level. The inverter 182 provides a logic "0" at the common enable lead 183 which is supplied through the individual enable leads 184. The inverter 117 responds to the logic "0" signal at individual enable lead 184 to provide a logic "1" signal at output 116 which is supplied to input 115 to reset the sequence latch 108. Thus, with logic "1" signal at input 115, the reset latch 108 changes states to provide a logic "0" signal to input 118 thereby disabling the common enable gate 96.

The Negative NAND gate 96 responds to a logic "0" at input 118 to provide a logic "1" signal to all of the level select identification elements 22$_a$ through 22$_h$ thereby disabling all the identification circuits 22. For example, the logic "1" signal supplied through circuit lead 193 appears at input 62 and the Positive AND 59 provides a logic "1" at output 60. The Positive NAND circuits 197 and 205 respond to the logic "1" signals at inputs 196 and 206, respectively, to provide logic "0" signals to the individual select lines 26 and 27. In such manner, logic "0" signals appear at all of the individual select lines 23 for all of the level select identification elements 22$_a$ through 22$_h$ which represent an open collector condition.

The release of the enable code find line (i.e. computer 12 placing a logic "1" at circuit lead 181) can be carried out at any desired time, such as immediately after the code has been latched in the level select receiver-driver element 20 (i.e. latches 129, 131) or as a last step in an interrupt request service sequence.

After an interrupt by the highest priority device has been serviced, the computer 12 can again initiate a code find sequence if required and repeat the process previously described.

The present invention can also advantageously be utilized to select any number of predetermined devices 13 for simultaneous operation with computer 12. By introducing a predetermined selection code on the device identification lines 18, the computer 12 can provide simultaneous multiple device selection for interaction with any predetermined number of the devices 13.

In a manner similar to that described above with respect to the general enable sequence wherein a code for all of the devices is loaded by the computer 12 into the priority identification signal generator 15, the computer 12 loads only the code that is common for the selected devices 13 that are to be group selected.

For the sake of simplicity in illustrating the group selection sequence, let it be assumed that the system is operating with only sixteen peripheral devices 13. With such assumption, the system only requires the use of a common select lines 21$_e$ through 21$_h$ together with the interconnected corresponding individual select lines for the interface circuits 16, namely 23$_e$ through 23$_h$.

Under such assumptions, Table I may be used to illustrate the predetermined energization of selected device identification lines 18 to select certain predetermined groups of devices 13 as required or desired by computer 12.

The devices that have been numbered in Table I as 4–7, inclusive, have previously had their priority assign-

TABLE I

| Device Identification Line | Select Line | Binary Weight | | | | Energization Pattern | | | | | (1 = Grounded) | |
|---|---|---|---|---|---|---|---|---|---|---|---|---|
| | | 3 | 2 | 1 | 0 | A | B | C | D | S | T | AA |
| (11) | 25$_e$ | 0 | | | | 1 | 1 | | 1 | | 1 | 1 |
| (10) | 25$_f$ | | 0 | | | 1 | 1 | 1 | 1 | 1 | | 1 |
| (9)  | 25$_g$ | | | 0 | | 1 | 1 | 1 | 1 | 1 | 1 | |
| (8)  | 25$_h$ | | | | 0 | 1 | 1 | 1 | 1 | 1 | 1 | 1 |
| (3)  | 24$_e$ | 1 | | | | 1 | | 1 | 1 | 1 | | |
| (2)  | 24$_f$ | | 1 | | | 1 | 1 | 1 | | 1 | 1 | |
| (1)  | 24$_g$ | | | 1 | | 1 | 1 | 1 | 1 | 1 | 1 | 1 |
| (0)  | 24$_h$ | | | | 1 | 1 | 1 | 1 | 1 | | 1 | 1 |

| Device No. | Binary No. | | | | | | | | | |
|---|---|---|---|---|---|---|---|---|---|---|
| 0  | 0 | 0 | 0 | 0 | * | * | | * | | |
| 1  | 0 | 0 | 0 | 1 | * | * | | * | | |
| 2  | 0 | 0 | 1 | 0 | * | * | | * | | * |
| 3  | 0 | 0 | 1 | 1 | * | * | | * | | * |
| 4  | 0 | 1 | 0 | 0 | * | * | | | * | |
| 5  | 0 | 1 | 0 | 1 | * | * | | | * | |
| 6  | 0 | 1 | 1 | 0 | * | * | | | * | |
| 7  | 0 | 1 | 1 | 1 | * | * | | | * | |
| 8  | 1 | 0 | 0 | 0 | * | | * | * | * | |
| 9  | 1 | 0 | 0 | 1 | * | | * | * | | |
| 10 | 1 | 0 | 1 | 0 | * | | * | * | * | |
| 11 | 1 | 0 | 1 | 1 | * | | * | * | | |
| 12 | 1 | 1 | 0 | 0 | * | | * | | * | |
| 13 | 1 | 1 | 0 | 1 | * | | * | | | |
| 14 | 1 | 1 | 1 | 0 | * | | * | | * | |
| 15 | 1 | 1 | 1 | 1 | * | | * | | | |

The first column in Table I sets forth the device identification line 18 which is selectively energized by computer 12. The upper half of the second column sets forth the particular select line 21 to be energized via the corresponding identification line 18. The lower half of the second column sets forth the device number which, in the illustrated example, includes only sixteen devices 13 for possible selection by computer 12. The upper portion of the third column sets forth the relative binary weight accorded to each of the device identification lines 18, and illustrates that the device identification lines (8), (9), (10) and (11) are of the least significant weight whereas the device identification lines (0), (1), (2) and (3) are of more significant weight. The lower portion of the third column sets forth the binary coded number for the respective devices identified in the second column. The upper portion of the fourth column sets forth the energization pattern for each device identification line 18 to be commanded by computer 12. The lower portion of the fourth column sets forth the groups of devices selected which correspond to the energization pattern immediately above.

Assume for example that computer 12 desires to transmit data simultaneously to four printers which are identified as devices numbered 4–7 in the second column of Table I. In such situation, computer 12 simply energizes certain selected device identification lines 18 according to the selection pattern "T" illustrated in the fourth column of Table I. Specifically, computer 12 supplies logic "1" signals to the device identification lines designated (11), (9), (8), (2), (1) and (0). Such selected group code is gated into the D-type latches (i.e. 129, 131) by computer 12 supplying a gating pulse to circuit 132. Further, computer 12 supplies a gating pulse to the transmission gates (i.e. 139, 140) to place the selected group code on the common select lines 21 which also appears on the individual select lines 23 for all of the devices 13.

ment circuits 31 preset to a unique code corresponding to its respective device 13, with the unique codes for such four devices also within the selected group code under pattern "T" of the present illustration.

Only the devices 13 designated 4–7 in Table I respond to the selected group code as appearing at the individual select lines 23 to provide a logic "1" qualified device signal at the outputs 165 of the Positive NANDs 164. Such logic "1" qualified device signals are supplied to each of the devices 13 numbered 4–7 in Table I through the outputs 240 to enable the respective devices 13 and allow the computer 12 to transmit data through the data and data control lines 14 to simultaneously communicate with the selected four devices.

The system may therefore be advantageously used to provide simultaneous communication between computer 12 and any particular grouping of selected devices 13 as desired.

The system can in many instances detect a malfunction in any given interface circuit 16 to either disable the particular interface circuit 16 having the malfunction or, in certain cases, to continue operation with the malfunctioning interface circuit 16. The computer 12 may identify a malfunctioning interface circuit 16, record in certain instances the particular malfunctioning electrical element or component and, as mentioned above, either disable the malfunctioning interface circuit 16 and accompanying device 13 to exclude it from system operation or continue operation with such malfunctioning interface circuit 16.

If a malfunction in one of the interface circuits 16 occurs after operation has commenced (i.e. enabled), it may be necessary to locate such malfunctioning interface circuit 16 and disconnect it from system operation. For example, computer 12 may receive an interrupt request signal on circuit 185 indicating that at least one device 13 is requesting an interrupt. When receiving the interrupt signal at circuit 185, computer 12 operates an internal timer 245. If a predetermined period of time expires following receipt of the interrupt request signal and computer 12 fails to receive the highest priority selection qualified signal at circuit 185 and a unique code signal at lead 228, the timer within computer 12 times out to provide an indication that a malfunctioning element exists in the system. At such point, computer 12 supplies a gating signal via circuit 229 to gate the code existing on the common select lines 21 into computer 12. If a proper code address exists on the common select lines 21, the computer 12 realizes that a malfunction exists in the Positive NAND 164 or in the last element $22_h$ with respect to either the Positive OR 43, the Positive AND 149, the Negative NAND 155, or inverter 146 with switch $32_h$ open. If the code monitored by computer 12 is improper or incomplete, a malfunction exists anywhere in elements $22_a$ through $22_g$, or in gates $59_h$, $197_h$, $201_h$, $205_h$, or inverter $146_h$ with switch $32_h$ closed, or the common enable gate 96, or in one of the gates of the sequence latch 108.

If during a code find sequence the various elements 22 are being cascaded in a priority selection sequence but cascading stops at one particular element, such as element $22_d$ for example, the internal timer of computer 12 will again time out after a predetermined time (i.e. 1 usec for example). In other words, the system is unable to generate a highest priority selection qualified signal at lead 185 or a unique code signal at circuit 228 indicating that priority selection has been completed. In such instance, computer 12 again reads the code on the common select lines 21 by operating the gate circuit 229. When analyzing such code, computer 12 realizes that the priority selection cascade has ceased at the level corresponding to $22_d$. In such instance, computer 12 selectively addresses each of the common select lines $24_d$ and $25_d$ for a predetermined time (i.e. timer 245) and again checks to see if the highest priority selection qualified signal is generated at circuit 185 or a unique code signal is generated at circuit 228.

If a code is not generated, all select lines below the last qualified level are energized (i.e. logic "1") to determine if the device is addressable (i.e. logic "1" at lead 185). If a logic "1" signal appears at lead 185, computer 12 knows that the device is addressable. In such situation, the select lines below the last qualified level are de-energized (i.e. logic "0") sequentially one at a time. In such manner, the lead 185 is monitored by computer 12 to generate the device code by monitoring each level individually. If lead 185 provides a logic "1" signal, the computer 12 will maintain the corresponding select line de-energized (i.e. logic "0"). If lead 185 provides a logic "0" signal, the computer 12 will render the corresponding select line energized (i.e. logic "1"). Thus, the device code is completed and the select lines will contain the address code for the device seeking the interrupt.

If selective addressing of various levels fails to complete the cascaded priority selection process, the device is unaddressable and computer 12 provides a logic "0" general disable signal on circuit 250 which is inverted by inverter 251 to provide a logic "1" signal on a common disable circuit 252. Such logic "1" is supplied to the individual general disable circuits 253 for all of the interface circuits 16. An inverter 254 in each interface circuit 16 inverts the logic "1" signal to provide a logic "0" to an input 255 of the Positive NOR 83. Such logic "0" at input 255 produces a logic "1" signal at the resetting input 89 of the enable latch 85. In such manner, the enable latch 85 is reset to provide a logic "0" at output 90, as previously described in the initialization sequence. Next, computer 12 proceeds with a general enable sequence (which was described earlier) and loads the general enable code for all devices simultaneously into the level select receiver-driver elements 20 via the device identification lines 18. Such general enable code is gated to the common select lines. The malfunctioning interface circuit 16, however, is unaddressable because of the malfunction in one of its elements (i.e. inverter 146 with switch 32 open, gates 149, 155, 43 or 164) and therefore will not be re-enabled into system operation. In such manner, the malfunctioning interface circuit 16 is removed from the system while all other interface circuits 16 are permitted continued operation for priority selection sequences without any interference from the particular malfunctioning interface circuit 16.

In other instances, an error may occur in one of the interface circuits 16 but such malfunctioning interface circuit is addressable by computer 12 and may, in such circumstances, continue operating within the system.

For example, a malfunctioning interface circuit 16 may respond to an interrupt request and provide an interrupt request signal to computer 12 via circuit 185, as previously discussed with respect to the interrupt sequence. Computer 12, however, may have failed to receive either the highest priority selection qualified signal at circuit 185 or the unique code signal at circuit 228 within the expiration of the predetermined time (i.e. timer 245), as previously discussed. In such situation, the computer 12 again reads the code existing on the common select lines 21 by providing a gating signal to the circuit 229. If computer 12 fails to detect any code existing on the common select lines 21, it is determined that a malfunction exists in the control logic, such as in gates $59_a$, $197_a$, $205_a$, $201_a$, 109, 110, 96 or inverters 117 or $146_a$ with switch $32_a$ closed. In such no code condition, computer 12 provides a general address to all levels to see if the interface circuit 16 is addressable. If in fact all elements 22 are addressable, the Positive NAND 164 will provide a device qualified signal at output 165 which, in turn, causes a logic "1" at line 185 indicating that the malfunctioning element is addressable.

In order to identify the malfunctioning interface circuit 16, computer 12 energizes all select lines 23 and thereafter sequentially de-energizes each select line 23 and simultaneously monitors the highest priority selection qualified signal at circuit 185 to determine whether it remains a logic "1" or changes state. In such manner, computer 12 can determine the code of the particular interface circuit 16 where the malfunction has occurred. With such procedure, the computer 12 can either directly address the malfunctioning interface circuit 16 corresponding to the device seeking an interrupt to thereby energize the enable data line 240 for system operation or computer 12 could disable the malfunctioning interface circuit 16 and remove it from system operation.

If an error occurs in one of the elements 22 resulting in a partial code condition, computer 12 will read the code on the common select lines 21 to determine which element is causing the stoppage in the cascaded priority selection process. Computer 12 thereafter selectively energizes the individual select lines 23 and attempts to complete the cascaded selection process. In such manner, computer 12 may in certain circumstances induce a generated device qualified signal at output 165 thereby completing the priority selection sequence to permit continued operation with the malfunctioning interface circuit 16 even though a defect or malfunction has occurred in one of the elements 22.

In the event a failure occurs in inverter 146 or gate 201 of a lower level element (i.e. 22$_b$ ... 22$_h$), the interface circuit 16 may generate a highest priority selection qualified signal at circuit 185 but might fail to generate a unique code signal at circuit 228 because the Exclusive OR circuit 221 is not satisfied (i.e. logic "1" signals appearing at circuits 24 and 25). During a normal running sequence, computer 12 supplies a general enable signal (logic "0") to circuit 187 to enable the identification circuits 22. Computer 12 thereafter reads the code on the common select lines 21 and in such manner determines that a non-unique code exists at a certain level, which would exist if logic "1" signals simultaneously existed on both of the pair of select lines, such as 23$_d$ corresponding to element 22$_d$ for example. In such situation, computer 12 reads and stores in a register or memory the code on the individual select line pairs 23$_a$ through 23$_c$. Next, computer 12 adds logic "1" signals in the bits of the register corresponding to select lines 23$_e$ through 23$_h$, inclusive. The computer 12 stores a "one" in the register bit corresponding to the select line 26$_d$ and a "zero" in the register bit corresponding to the select line 27$_d$. Computer 12 thereafter places a logic "1" general enable signal at circuit 187 which causes all I/O interface circuits 16 to release the select lines. The computer 12 thereafter loads the code stored in the register into the priority identification signal generator 15 in the manner as discussed above with respect to group selection in preparation for disabling a group of devices. Such disable is initiated by computer 12 supplying a logic "0" at a circuit 256. An inverter 257 inverts such logic "0" signal to provide a logic "1" signal at a common disable device circuit 258. Such logic "1" signal appears on each individual disable device circuit 259 and at an input 260 of a Negative NAND gate 261. With a logic "1" code select signal at an input 262, as provided by Positive NAND 164, the Negative NAND 261 provides a logic "0" signal to an input 263 of the Positive NOR 83. With a logic "0" at input 263, the Positive NOR 83 provides a logic "1" at input 89 to reset the enable latch 85. Thereafter, computer 12 removes the code from the select lines and again supplies a general enable signal (logic "0") at circuit 187 and again reads the code on the common select lines 21. The code which appears at such instance will correspond to the device having a lower priority which was causing the malfunction. At such point, computer 12 having identified the defective device may service the interrupt request and may either disable such malfunctioning interface circuit 16 or maintain it within the system as above described. In any event, after computer 12 again drops the general enable signal at circuit 187 and re-enables the system by addressing the code retained within its register on the select lines, it re-enables the devices that had been previously removed from contention. Computer 12 thereafter removes the code from the select lines and re-energizes the general enable line 187. As a result, the code appearing on the common select lines identifies the highest priority device seeking an interrupt without any interference from the malfunctioning circuit.

In such manner, certain malfunctions may exist which initially prevent the completion of the priority selection process but may be overcome by selectively addressing the system to initially detect the particular malfunctioning interface circuit 16 according to its unique code and particularly identify the malfunctioning level select identification element. In that the malfunctioning interface circuit 16 continues to remain addressable by computer 12, it may be either maintained operational for continued circuit operation or removed. In any event, computer 12 can readily identify the malfunctioning circuit for ready repair or replacement thereof.

The system is constructed and operated in a manner which provides for continued operation of the system in most instances, notwithstanding a malfunction in one of the interface circuits 16. In many instances, the malfunctioning interface circuit 16 may continue operation to maintain its associated device within system operation. Alternatively, a malfunctioning interface circuit 16 may be removed from system operation without having any effect upon the continued operation of the remainder of the system for priority selection. Thus, the circuit can have an open circuit condition in any one of a number of locations without effecting the overall system operation.

The system can be used with any number of select lines, such as for example and without limitation 32, 64, etc. Further, the level select receiver-driver elements 20 in large systems can be stacked to form a master system and one or more sub-systems for multiple expansion capabilities where a large number of devices 13 are to be serviced. With such construction, each sub-system may simultaneously proceed through a code find sequence while the master system likewise proceeds through a priority selection sequence wherein each highest priority device in each sub-section vies for ultimate selection as the highest priority qualified device.

The system can be used in a versatile environment and in conjunction with a wide variety of applications. For example, some or all of the above described circuitry could be utilized within a telephone automatic number identification system. Alternatively, it could be used to control third dimension (3-D) graphics to allow depicted objects to move in front of other objects farther removed from the observer as appearing on a graphics display or the like for establishing a priority for objects, wherein the highest priority would be assigned to closer objects while background objects would be assigned a lower priority.

The system has particular advantage over the conventional daisy chain constructions wherein priority is determined through a serial connection with a computer accessing one end. Open circuit conditions in such daisy chain construction can readily cause irrecoverable loss of interrupt capability of devices more distant from the computer than the malfunctioning device.

The system provides a unique dynamic code generating system which is selectively encodeable to provide a unique priority selection sequence.

Various modes of carrying out the invention are contemplated as being within the scope of the following claims particularly pointing out and distinctly claiming the subject matter which is regarded as the invention.

We claim:

1. A priority selector for a plurality of data elements selectively seeking priority recognition, comprising
a plurality of groups including at least a pair of lines for each data element arranged in a predefined order of priority importance from a first group of high priority importance to a last group of low priority importance with each group electrically connected to corresponding groups for other data elements, means for each of said data elements operatively connected to said plurality of groups of lines for assigning a priority code for said data elements to each of said plurality of groups of lines in response to said data elements seeking priority recognition, and means for each of said data elements operatively connected to said plurality of groups of lines for sensing the priority code at each of said groups of lines for prohibiting said assigning means from assigning a priority code to said plurality of groups of lines of lower priority importance in response to a group of lines containing a sensed code of greater priority importance than the priority code assigned by said assigning means for establishing a code on said plurality of groups of lines which designates the highest priority data element seeking priority recognition.

2. The priority selector of claim 1, and including control means operatively connected to said plurality of groups of lines to read the code having the highest priority significance associated with a data element seeking priority recognition.

3. The priority selector of claim 1, and including control means operatively connected to said plurality of groups of lines and including a code detector operable to provide a unique code signal in response to said code of said data element seeking a priority recognition having the highest priority significance.

4. The priority selector of claim 1, and including control means operatively connected to said plurality of groups of lines and operable to select a predetermined data element by issuing a predetermined address code.

5. The priority selector of claim 1, and including control means operatively connected to said plurality of groups of lines and operable to select any one of a number of groups of data elements by issuing a predetermined address code.

6. The priority selector of claim 1, and including control means operatively connected to said plurality of groups of lines and operable to detect which data element is associated with a malfunction.

7. The priority selector of claim 1, and including control means operatively connected to said plurality of groups of lines and operable to remove one of said data elements from a priority selection sequence in response to a malfunction.

8. The priority selector of claim 1, and including means for said level select identification elements and operatively connected to said select lines for comparing the code sensed at each of said groups of lines with said assigned code for said groups of lines to provide a level qualified signal in response to the priority significance of said assigned code being at least as great as the priority significance of the assigned codes for the corresponding groups of lines associated with other data elements.

9. The priority selector of claim 8, wherein said groups of lines are arranged in descending order of priority importance, and including interlock means to selectively enable succeeding groups of lines of lower priority importance in response to a level qualified signal from a group of lines of higher priority importance.

10. The priority selector of claim 8, and including means to select a data element in response to sensed qualified signals from said comparing means.

11. The priority selector of claim 1, and including control means responding to a unique code at each of said groups of lines to provide a unique code signal indicating that priority selection is complete.

12. A priority selector for a plurality of data elements selectively issuing priority requests, comprising a plurality of selection means each connected to a corresponding data element to select one of such data elements with a highest assigned priority from among said data elements issuing a priority request, each selection means including a series of level select identification means sequentially arranged in descending order of priority importance from first identification means of highest priority to last identification means of lowest priority with each identification means including codeable individual select means including high priority individual select means and low priority individual select means with said individual select means connected to corresponding codeable individual select means from corresponding identification means of the same priority importance provided by other selection means and encoding means selectively operable to provide an assigned code having a predetermined priority significance and connected to encode said individual select means with said assigned code and qualifying means operably connected to said individual select means and to said encoding means and operable between a first condition to provide a qualified signal in response to said assigned code having a priority significance at least as great as the priority significance of corresponding identification means of other selection means and a second condition to provide a nonqualified signal in response to said assigned code having a priority significance less than the priority significance of at least one other selection means, and means connected to said qualifying means provided by said series of identification means to provide a data element qualified signal in response to qualified signals from said series of identification means provided by said selection means corresponding to said data element having the highest assigned priority with respect to all data elements issuing priority requests.

13. A priority selection circuit for selectively interfacing a plurality of data elements with a common control, comprising a priority identification signal generator including a series of codeable inputs connected to said common control to send and receive first coded signals corresponding to one or more of said data elements, a series of latches operatively connected to said codeable inputs to selectively store said first coded signals in response to a storage command from said common control, a series of gates operatively connected to said codeable inputs to selectively transfer said first coded signals to a series of codeable pairs of common select lines in response to a transfer signal from said common control, a series of detector circuits each connected to one of said codeable pairs of common select lines to provide a unique code signal to said common control in response to a unique code on said common select lines, and a gatable control circuit connected to said common select lines to transfer coded signals on said common select lines to said common control in response to a read command signal from said common control, a plurality of interface circuits each connected to a corresponding data element and operatively connected to each other and with said priority identification signal generator with each interface circuit including a priority request circuit operatively connected to said corresponding data element and to said common control to provide a priority initiation signal in response to a priority request signal from said data element and an enable signal from said common control, a series of level select identification elements sequentially arranged in descending order of priority importance from a first identification element of highest priority importance to a last identification element of lowest priority importance with each identification element providing a codeable input selectively operable to provide a first coded signal corresponding to a high priority designation and a second coded signal corresponding to a low priority designation, a codeable pair of individual select lines including a high priority individual select line and a low priority individual select line with said individual select lines connected in common with corresponding codeable pairs of individual select lines from corresponding identification elements of the same priority importance provided by other said interface circuits and further connected in common with corresponding codeable pairs of said common select lines provided by said priority identification signal generator with each individual and common select line constructed to function as an open collector circuit, an encoding circuit operatively connected to said codeable input and said priority request circuit and operable in response to said priority initiation signal between a first condition to provide a high priority code on said high priority individual select line and a low priority code on said low priority individual select line in response to said first coded signal from said codeable input and a second condition to provide a low priority code on said high priority individual select line and a high priority code on said low priority individual select line in response to said second coded signal from said codeable input, a qualifying circuit operatively connected to said codeable input and said high and low priority individual select lines and operable between a first condition to provide a level qualified signal in response to a high priority code on said high priority individual select line and said first coded signal from said codeable input and in response to a low priority code on said high priority individual select line and said second coded signal from said codeable input and a second condition to provide a level disqualified signal in response to a high priority code on said high priority individual select line and said second coded signal from said codeable input, an interlock circuit interconnecting adjacent level select identification elements to operatively disable descending level select identification elements of lower priority importance in response to one of said higher priority level select identification elements providing said level disqualified output signal, and a priority responsive circuit operatively connected to each of said identification elements and to said data element and to said common control and operable between a first condition to provide a data element qualified signal indicating that said corresponding data element possesses the highest assigned priority with respect to all data elements issuing a priority request in response to level qualified signals from each identification element and a second condition to provide a data element non-qualified signal in response to said level disqualified signal from one of said identification elements.

14. A priority selector for a plurality of data elements selectively seeking priority recognition, comprising a series of level select identification elements for each data element arranged in a predetermined order of priority importance from a first identification element of highest priority importance to a last identification element of lowest priority importance with each identification element providing a codeable pair of individual select lines including a high priority individual select line and a low priority individual select line with said individual select lines connected to corresponding codeable pairs of individual select lines for corresponding identification elements of the same priority importance for the other data elements, encoder means for said level select identification elements and operatively connected to said select lines for providing a high priority code on said high priority individual select line and a low priority code on said low priority individual select line to establish a high priority designation and to provide a low priority code on said high priority individual select line and a high priority code on said low priority individual select line to establish a low priority designation, means for said level select identification elements and operatively connected to said select lines for qualifying each pair of high and low priority individual select lines to provide a level qualified output when the corresponding codeable pairs of individual select lines for other of said data elements seeking priority recognition do not have a higher priority code at said pair of lines and to provide a level disqualified output when the corresponding pair of lines of at least one other of said data elements seeking priority recognition provides a higher priority code, and disable means for said level select identification elements and operatively connected to said select lines for operatively disabling level select identification elements of lower priority importance in response to one of said higher priority level select identification elements providing said level disqualified output signal for establishing a code at said pairs of individual select lines which designates the code corresponding to the highest priority data element seeking priority recognition.

* * * * *